(12) United States Patent
Matsuo et al.

(10) Patent No.: US 11,187,274 B2
(45) Date of Patent: Nov. 30, 2021

(54) SLIDABLE CONSTANT SPEED UNIVERSAL JOINT

(71) Applicant: NTN CORPORATION, Osaka (JP)

(72) Inventors: Shigehiro Matsuo, Iwata (JP); Yasuaki Takekawa, Iwata (JP)

(73) Assignee: NTN CORPORATION, Osaka (JP)

( * ) Notice: Subject to any disclaimer, the term of this patent is extended or adjusted under 35 U.S.C. 154(b) by 334 days.

(21) Appl. No.: 16/337,082

(22) PCT Filed: Sep. 1, 2017

(86) PCT No.: PCT/JP2017/031548
§ 371 (c)(1),
(2) Date: Mar. 27, 2019

(87) PCT Pub. No.: WO2018/061611
PCT Pub. Date: Apr. 5, 2018

(65) Prior Publication Data
US 2020/0003262 A1    Jan. 2, 2020

(30) Foreign Application Priority Data

Sep. 28, 2016 (JP) .............................. JP2016-189106

(51) Int. Cl.
*F16D 3/227* (2006.01)
*F16D 3/223* (2011.01)
(52) U.S. Cl.
CPC .... *F16D 3/227* (2013.01); *F16D 2003/22309* (2013.01); *Y10S 464/906* (2013.01)

(58) Field of Classification Search
CPC .. F16D 3/227; F16D 2003/22309; F16D 3/56; Y10S 464/906
(Continued)

(56) References Cited

U.S. PATENT DOCUMENTS 1,987,678 A * 1/1935 Ketcham ................. F16L 29/00
464/169
4,540,384 A * 9/1985 Bennett ................... F16D 3/845
(Continued)

FOREIGN PATENT DOCUMENTS

JP    2008-115943 A    5/2008
JP    4896670 B2    3/2012
(Continued)

*Primary Examiner* — Greg Binda
(74) *Attorney, Agent, or Firm* — Muncy, Geissler, Olds & Lowe, P.C.

(57) ABSTRACT

A sliding constant velocity universal joint includes an outer joint member connected to a power transmission member and an inner joint member connected to an end portion of a shaft, for torque transmission between the outer joint member and the inner joint member while allowing an angle change and an axial change therebetween. The outer joint member incorporates therein an elastic member axially expandable/retractable between a tip of the shaft connected to the inner joint member and the outer joint member; the tip of the shaft is provided with a shaft protruding portion for supporting an inner diameter portion of a shaft-side end of the elastic member; the elastic member has its outer-joint-member side end provided with a receptacle for fitting into an inner diameter portion of the elastic member; the outer joint member has its inner surface press-fitted by an end plate; and the receptacle is pressed onto the end plate in the inner surface of the outer joint member.

8 Claims, 14 Drawing Sheets

(58) Field of Classification Search
USPC .......................................................... 464/169
See application file for complete search history.

(56) References Cited

U.S. PATENT DOCUMENTS 5,224,898 A * 7/1993 Johnson .................. E21B 17/07
 464/169
2008/0234057 A1 9/2008 Takekawa

FOREIGN PATENT DOCUMENTS

JP 4920465 B2 4/2012
JP 2014-20434 A 2/2014

* cited by examiner

SLIDABLE CONSTANT SPEED UNIVERSAL JOINT

TECHNICAL FIELD

The present invention relates to sliding constant velocity universal joints for use in power trains in automobiles and many other industrial equipment, and more specifically to a sliding constant velocity universal joint capable of transmitting rotational movement at a constant velocity even if a drive shaft and a driven shaft to be connected with each other are at an angle (operating angle), and of making relative axial movement between the drive shaft and the driven shaft.

BACKGROUND ART

As shown in FIG. 11 for example, a power transmission system of a vehicle such as an automobile and an agricultural tractor has two power transmission members 102, 102, one serving as a drive shaft and the other serving as a driven shaft, and they are spaced from each other by a predetermined distance and disposed non-collinearly with each other.

These two power transmission members 102, 102 are connected with each other via a shaft 101 which is disposed therebetween and has its two ends provided with constant velocity universal joints 103, 103 for pivotable connection of the two members.

A conventional constant velocity universal joint 103 may have a structure as shown in FIG. 11 through FIG. 14 (Patent Literature 1).

This conventional constant velocity universal joint 103 is left-right symmetrical with each other as shown in FIG. 11, so reference will only be made for the right-side constant velocity universal joint 103, and a structure thereof will now be described with reference to FIG. 12.

FIG. 12 shows a state before the constant velocity universal joint 103 is installed to a power transmission member 102 or after it is removed therefrom. The constant velocity universal joint 103 includes an outer joint member provided by an outer ring 104, an inner joint member provided by an inner ring 105, balls 106 and a cage 107.

The outer ring 104 has a large-diameter tube portion 108 and a small-diameter tube portion 109 formed coaxially with each other. The small-diameter tube portion 109 has a fitting portion in its inner circumferential surface, into which a spline shaft 111 of the mating power transmission member 102 is axial inserted in a torque-transmittable fashion. The inner circumferential surface of the fitting portion is formed with a female spline 110 for engagement with a male spline 112 formed axially in the spline shaft 111.

Also, the large-diameter tube portion 108 of the outer ring 104 has a housing space 113 which houses therein the inner ring 105, the balls 106, the cage 107 and so on. The outer ring 104, which provides the housing space 113, has its internal surface formed with a plurality of axially extending ball grooves 114 at a constant circumferential interval.

The inner ring 105 has an insertion hole for inserting and fitting the shaft 101. The insertion hole has its inner circumferential surface formed with an axially extending female spline 116 for engagement with a male spline 115 which is formed on an outer circumference at an end region of the shaft 101. Also, a snap ring 117 which prevents the shaft 101 from coming off once it is inserted into the insertion hole of the inner ring 105 is attached into an annular snap ring groove provided in an outer circumference near a tip of the shaft 101.

The inner ring 105 has a spherical outer circumferential surface, in other words, a spherical outer surface, and in this spherical outer surface a plurality of axially extending ball grooves 118 are formed at a constant interval in the circumferential direction.

The ball grooves 114 in the outer ring 104 and the ball grooves 118 in the inner ring 105 work as pairs. Each pair of the ball grooves 114, 118 provides a track, in which there is assembled a torque transmission element that is the ball 106. In this arrangement, each ball 106 is held by the cage 107. The cage 107 has an outer and an inner spherical surface, and the outer spherical surface makes contact with an inner surface of the outer ring 104 whereas the inner spherical surface makes spherical contact with the outer spherical surface of the inner ring 105.

In other words, the balls 106 roll along the ball grooves 114 in the outer ring 104, whereby the shaft 101 is movable, integrally with the inner ring 105, the ball 106 and the cage 107, axially in fore-aft direction with respect to the outer ring 104.

In the housing space 113 of the outer ring 104, a platy receptacle member 123 is placed. The receptacle member 123 is fitted into an annular recess 122 formed in a stepped surface which connects an inner surface of the large-diameter tube portion 108 and an inner surface of the small-diameter tube portion 109.

Between the receptacle member 123 and an end of the shaft 101, a coil spring 121 is provided as an elastic force application means for elastically urging the shaft 101 in a backing direction with respect to the constant velocity universal joint 103 (the outer ring 104). In other words, the constant velocity universal joint 103 is elastically urged toward its counterpart, which is the power transmission member 102, by the coil spring 121. Also, the coil spring 121 has its left end attached to the tip of the shaft 101 protruding from the insertion hole of the inner ring 105. The coil spring 121 has its right end provided with a cap-shaped contact member 124. The contact member 124 is formed with a convex spherical surface portion 126, while the receptacle member 123 is formed with a concave spherical surface portion 123a for contact by the convex spherical surface portion 126. In these arrangements, the convex spherical surface portion 126 of the contact member 124 which is elastically urged by the coil spring 121 makes pressing contact onto the concave spherical surface portion 123a of the receptacle member 123.

Also, the outer ring 104 is provided with a disengagement prevention member 130 which counteracts the elastic urge from the coil spring 121 so that the inner ring 105 will not come out of the outer ring 104. The disengagement prevention member 130 is a C-shaped ring having an opening in its circumferential direction. The disengagement prevention member 130 is attached into a fitting groove formed in an inner surface near a (left-side) opening of the large-diameter tube portion 108.

Next, the two power transmission members 102, 102, the shaft 101 and the constant velocity universal joints 103, 103 are connected with each other in the following steps.

First, as shown in FIG. 12, at each of (both) ends of the shaft 101, the constant velocity universal joint 103 is attached.

Next, the spline shaft 111 of the power transmission member 102 on one side is slid into the fitting portion of the small-diameter tube portion 109 of the corresponding constant velocity universal joint 103, and inserted further until the tip of the spline shaft 111 makes contact with the receptacle member 123 (see FIG. 13).

Next, from the side opposed by the other constant velocity universal joint 103 which is not (yet) attached to the power transmission member 102, an axial pressing force is applied to the constant velocity universal joint 103 which is already attached to its corresponding power transmission member 102, to compress the coil springs 121, 121 in both of the constant velocity universal joints 103, 103.

More specifically, when a pressing force in an axial direction A shown in FIG. 14 is applied to the constant velocity universal joint 103 yet to be attached to its corresponding power transmission member 102, the pressing force is transmitted through the coil spring 121 of the constant velocity universal joint yet to be attached to its corresponding power transmission member, and the shaft 101, to the coil spring 121 of the constant velocity universal joint 103 on the other side. Thus, the coil spring 121 of the constant velocity universal joint which is already attached to its corresponding power transmission member receives a reaction force acting in the opposite direction to the axial direction A, from the power transmission member 102 attached thereto, and this reaction force is applied, through the shaft 101, to the coil spring 121 of the constant velocity universal joint which is not yet attached to its corresponding power transmission member. In other words, the above-described pressing force and reaction force are applied axially to the coil springs 121 from both sides, whereby both of the coil springs 121, 121 are compressed, to shorten an overall length from the tip of one of the constant velocity universal joints 103 to the tip of the other constant velocity universal joint 103 than the distance between the two power transmission members 102, 102.

As a result of the above-described step, as shown in FIG. 14, there is a gap S made between the tip of the constant velocity universal joint 103 which is not yet attached to the opposing power transmission member and the tip of the power transmission member 102.

Then, into the fitting portion of the constant velocity universal joint 103 yet to be attached to the power transmission member in FIG. 14, the spline shaft 111 of the opposing power transmission member 102 is slid, and inserted further until the tip of the spline shaft 111 makes contact with the receptacle member 123, and this completes the installation step. In the states where the installation is completed as shown in FIG. 13, fitting between each of the constant velocity universal joint 103, 103 and their respective power transmission members 102, 102 is maintained by the elastic force of the coil spring 121. Also, the shaft 101 is held at a position where the opposing elastic forces from the coil springs 121, 121 located at the two ends are balanced.

In FIG. 11, the two power transmission members 102, 102 are not disposed coaxially with each other. Therefore, with the constant velocity universal joints 103, 103 as installed to the power transmission members 102, 102, the shaft 101 is slanted with respect to the axis of the power transmission member 102. In this state, the shaft 101 and the coil spring 121 are coaxial with each other. Also, even when the shaft 101 pivots around the power transmission member 102, the contact member 124 moves smoothly on the concave spherical surface portion 123a of the receptacle member 123, and therefore the shaft 101 and the coil spring 121 are maintained coaxially with each other, ensuring that the elastic force from the coil spring 121 always works efficiently.

As has been described, according to the constant velocity universal joint 103 disclosed in Patent Literature 1, the coil spring 121 is placed between the end of the shaft 101 and the receptacle member 123 disposed inside the outer ring 104, and by using the coil spring 121, the receptacle member 123, etc., the distance between the two constant velocity universal joints 103 disposed at the ends can be slidably changed for easy installation within a fixed, predetermined space between the power transmission members 102, 102.

Next, as shown in FIG. 15 and FIG. 16, Patent Literature 2 discloses another example of assembling the end of the shaft 101 and the coil spring 121 incorporated inside the outer ring 104 in a sliding type constant velocity universal joint 103.

In this conventional constant velocity universal joint 103, a shallow-plate-like seal plate 223 is fitted to the recess 122 which is formed on a stepped surface that connects the inner circumferential surface of the large-diameter tube portion 108 of the outer ring 104 and the inner circumferential surface of the small-diameter tube portion 109; and to this seal plate 223, an end of the coil spring 121 is attached. Also, on the other end of the coil spring 121, a shallow-plate-like bearing member 224 is attached. The bearing member 224 has a convex spherical surface toward the seal plate 223. The bearing member 224 formed as the above has a concave spherical surface portion 225 on its side facing the shaft 101. The seal plate 223 and the bearing member 224 have short, cylindrical edge portions 223a, 224a respectively. The coil spring 121 has its ends held inside these edge portions 223a, 224a, whereby the coil spring 121 is prevented from moving in orthogonal directions away from its axial direction (prevented from moving out of alignment).

CITATION LIST

Patent Literature

Patent Literature 1: JP 4896670 B
Patent Literature 2: JP 4920465 B

SUMMARY OF INVENTION

Technical Problem

The conventional, sliding type constant velocity universal joint 103 according to Patent Literature 1 or Patent Literature 2 makes use of a structure where an end surface or an outer diameter portion of the coil spring 121 is engaged with the plate-like receptacle member 123, the shallow-plate-like seal plate 223 or the shallow-plate-like bearing member 224.

Because of this, it is not easy to visually confirm the state of assembly between the end surface or the outer diameter portion of the coil spring 121 and the plate-like receptacle member 123, the shallow-plate-like seal plate 223 or the shallow-plate-like bearing member 224, and there is a chance for error that the coil spring 121 will be attached in a slanted, unstable fashion.

If the coil spring 121 is attached in a slanted, unstable fashion, there can be such problems as restricted performance in the movement in fore-aft direction, undue buckling/deformation of the coil spring 121. In other words there can be negative influences on durability of the receptacle member 123, the seal plate 223 and/or the bearing member 224.

Also, if the coil spring 121 comes off the receptacle member 123, the seal plate 223 or the bearing member 224, it becomes impossible to provide the elastic urge for adjusting the distance between the two sliding type constant velocity universal joints 103 at the ends. This can lead to such problems as disconnection of the spline shaft 111 of the drive shaft (or the driven shaft) from the outer ring 104, interference between the end surface of the shaft 101 and a bottom portion or an end plate of the outer ring 104, or between the ball 106 and the disengagement prevention member 130, leading to loss of essential function as the constant velocity universal joint 103.

It is therefore an object of the present invention to provide a sliding constant velocity universal joint which allows consistent placement of the coil spring at a predetermined position and visible check into the state of assembly from an external view, with fewer chances for buckling/deformation of the compression coil spring while providing stable sliding characteristics.

Solution to Problem

In order to solve the above-described problems, the present invention provides a sliding constant velocity universal joint comprising an outer joint member connected to a power transmission member and an inner joint member connected to an end portion of a shaft, for torque transmission between the outer joint member and the inner joint member while allowing an angle change and an axial change therebetween. In this joint, the outer joint member incorporates therein an elastic member axially expandable/retractable between a tip of the shaft connected to the inner joint member and the outer joint member; the tip of the shaft is provided with a shaft protruding portion for supporting an inner diameter portion of a shaft-side end of the elastic member; the elastic member has its outer-joint-member side end provided with a receptacle for fitting into an inner diameter portion of the elastic member; the outer joint member has its inner surface press-fitted by an end plate; and the receptacle is pressed onto the end plate in the inner surface of the outer joint member.

The receptacle and the end plate may be made of metal or resin.

The shaft protruding portion for supporting the inner diameter portion of the elastic member, and the receptacle for fitting into the inner diameter portion of the elastic member may have their outer diameter surfaces provided by a combination of a cylindrical portion and a tapered portion. This arrangement makes it possible to improve assemblability into the inner diameter portions of the elastic member.

The receptacle's surface facing the end plate is formed with a convex spherical surface portion; the end plate is provided with a concave spherical surface portion for contact guide of the convex spherical surface portion of the receptacle; and the convex spherical surface portion has a smaller curvature radius than that of the concave spherical surface portion. In this arrangement it is possible to bring the convex spherical surface portion of the receptacle into an annular line-contact onto the concave spherical surface portion of the end plate. Thus, it becomes possible to provide a smooth stable sliding movement.

The convex spherical surface portion of the receptacle may have its center region formed with a flat end-surface portion. The arrangement makes it possible to decrease the area of contact between the convex spherical surface portion of the receptacle and the concave spherical surface portion of the end plate for smooth sliding movement.

Advantageous Effects of Invention

As described, according to the present invention, it becomes possible, by supporting the two ends of the coil spring with the outer diameter surface of the shaft protruding portion and the outer diameter surface of the convex portion of the receptacle, to place the coil spring stably at a predetermined position, and to visually check the state of assembly externally. Therefore, the coil spring no longer comes off the shaft protruding portion or the receptacle, and it is possible to elastically urge the sliding constant velocity universal joint in a sliding fashion.

DESCRIPTION OF EMBODIMENTS

Hereinafter, embodiments of the present invention will be described based on the attached drawings.

Figure 1:
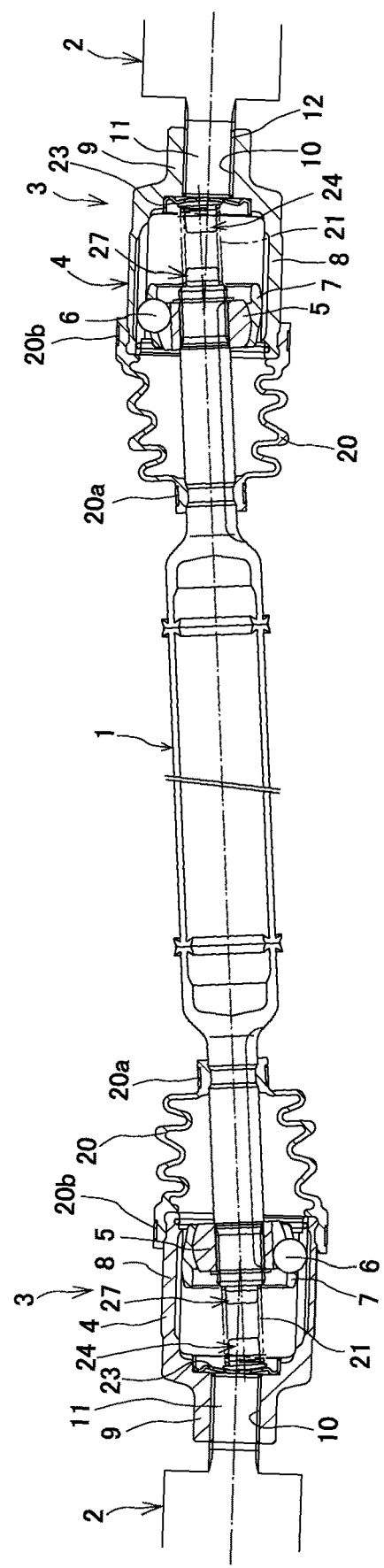
FIG. 1 is a sectional view which shows a propeller shaft having its two ends provided with sliding constant velocity universal joints according to the present invention.

As shown in FIG. 1, the present invention relates to sliding constant velocity universal joints 3, 3 which are utilized, for example, for a propeller shaft in a power transmission system employed in vehicles such as automobiles, agricultural tractors and the like, for pivotably connecting two ends of a shaft 1 disposed between two power transmission members 2, 2 to two respective ends of the power transmission members 2, 2, i.e., one functioning as a drive shaft and the other functioning as a driven shaft.

The pair of sliding constant velocity universal joints 3, 3 which are connected to the two ends of the shaft 1 have an identical structure (symmetrical) with each other. Therefore, description will be made only for one sliding constant velocity universal joint 3 on one of the ends of the shaft 1.

Figure 2:
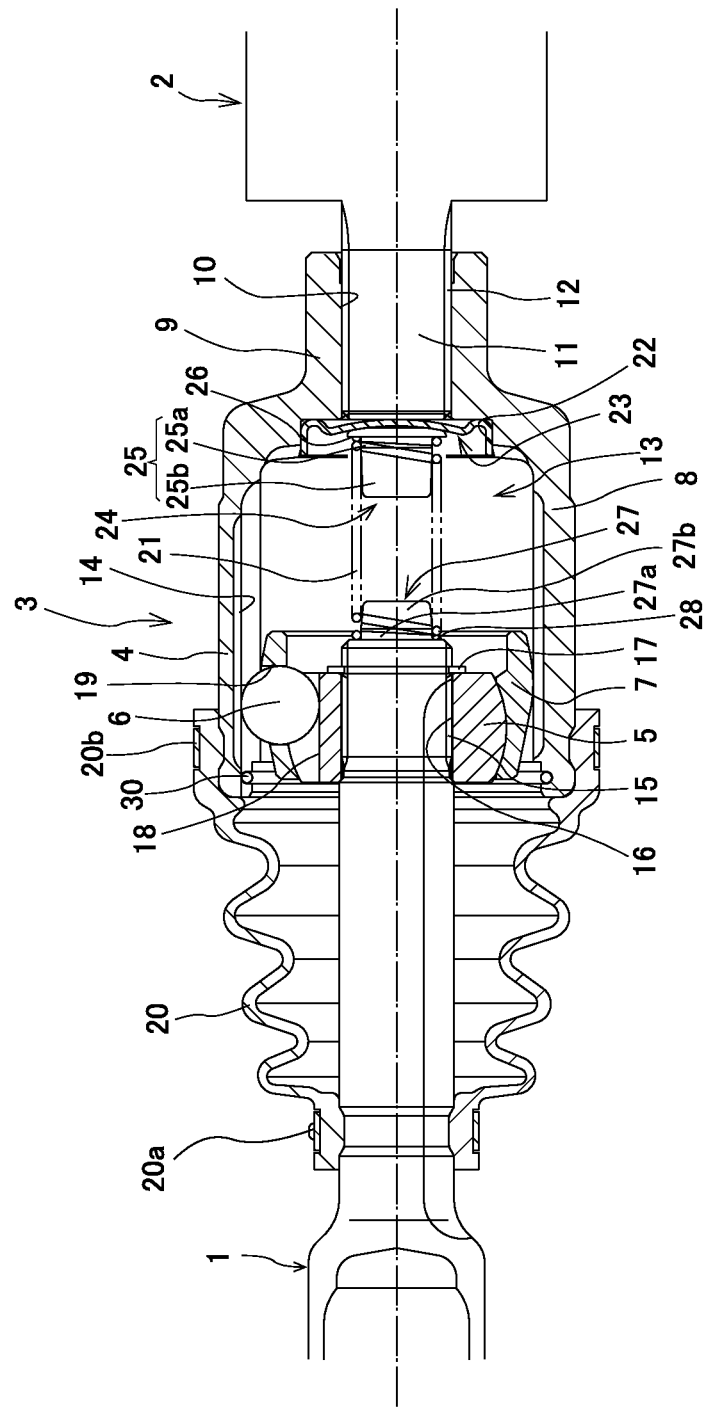
FIG. 2 is a sectional view of the sliding constant velocity universal joint in FIG. 1.

As shown in FIG. 2, the sliding constant velocity universal joint 3 according to the present invention includes an outer ring 4, an inner ring 5, balls 6 as torque transmission members, and a retainer 7.

The outer ring 4, which serves as an outer joint member, includes a large-diameter tube portion 8 and a small-diameter tube portion 9 formed integrally and coaxially with each other. The small-diameter tube portion 9 has its inner circumferential surface formed with axially extending female spline grooves 10, whereas the power transmission member 2 has its spline shaft 11 formed in its outer circumferential surface with male spline grooves 12 for engagement with the female spline grooves 10. In other words, the power transmission member 2 and the outer ring 4 are slidably connectable with/disconnectable from each other in an axial direction.

The large-diameter tube portion 8 of the outer ring 4 has a housing space 13 which is capable of housing therein the inner ring 5, the balls 6, the retainer 7 and so on. The large-diameter tube portion 8 has its inner circumferential surface formed with a plurality of axially extending ball grooves 14 at a constant circumferential interval. Also, a boot 20, made of rubber for example, is attached between an opening end of the large-diameter tube portion 8 and the shaft 1, using boot bands 20a, 20b.

The inner ring 5, which represents the inner joint member, has its inner circumferential surface formed with axially extending female spline grooves 16 for engagement with male spline grooves 15 which are formed in an outer circumferential surface at an end portion of the shaft 1. With these arrangements, a snap ring 17 is attached to near a tip of the shaft 1 which is inserted into the inner ring 5 in order to prevent the shaft 1 from being pulled off the inner ring 5.

Also, the inner ring 5 has its outer circumferential surface formed with a plurality of axially extending ball grooves 18 at a constant circumferential interval. The ball grooves 18 of the inner ring 5 and the ball grooves 14 of the outer ring 4 are opposed to each other. The opposed ball grooves 14, 18 of the inner and the outer ring 4, 5 provide tracks, each of which rotatably holds the ball 6.

The retainer 7 has a plurality of pockets 19 at a constant circumferential interval. The retainer 7 is placed between the outer ring 4 and the inner ring 5, and each pocket 19 holds one ball 6. The retainer 7 and the inner ring 5 make a spherical contact between their respective inner circumferential surface and outer circumferential surface, allowing the shaft 1 to assume operating angles (to change its angle). Also, since the balls 6 are rotatable along the ball grooves 14 of the outer ring 4, the balls 6, the shaft 1, the inner ring 5 and the retainer 7 are capable of axially moving (axially displaceable) as a unit with respect to the outer ring 4. In other words, the sliding constant velocity universal joint 3 is capable of transmitting torques between the outer ring 4 and the inner ring 5 while allowing angle changes and axial changes.

Also, in an inner circumferential edge at an opening end of the outer ring 4, a snap ring 30 provided by a circlip for example, is attached. The snap ring 30 interferes with the ball 6, thereby preventing the inner ring 5, the shaft 1 and other parts from dropping off the outer ring 4.

Inside the housing space 13 of the outer ring 4, there is placed an elastic member which is provided by an axially expandable/retractable coil spring 21.

An inner circumferential surface of the large-diameter tube portion 8 and an inner circumferential surface of the small-diameter tube portion 9 in the outer ring 4 are connected by a stepped surface, in which a recess 22 is formed for fitting a shallow-plate-like end plate 23.

Figure 3:
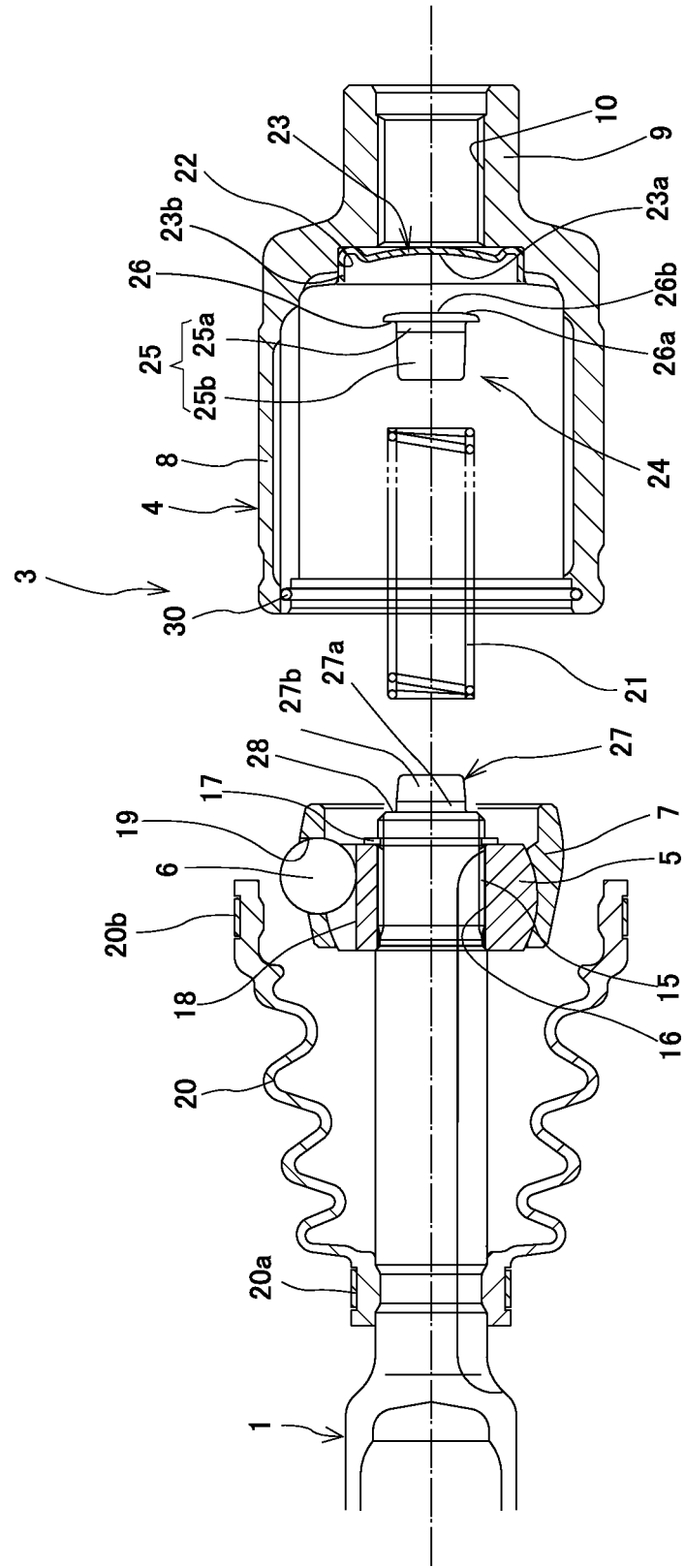
FIG. 3 is a sectional view of the sliding constant velocity universal joint in FIG. 1 in its disassembled state before assembling.
Figure 9:
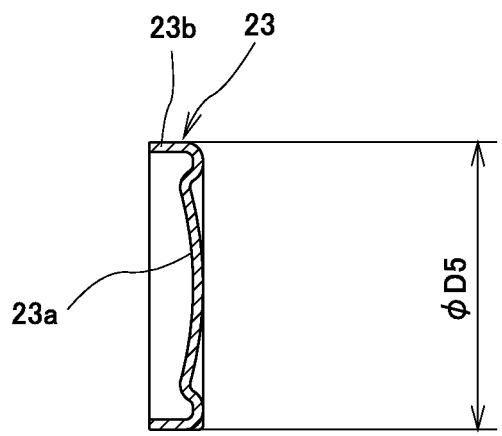
FIG. 9 is an enlarged sectional view of an end plate which is fitted into a recess in an outer ring of the sliding constant velocity universal joint in FIG. 1.
Figure 10:
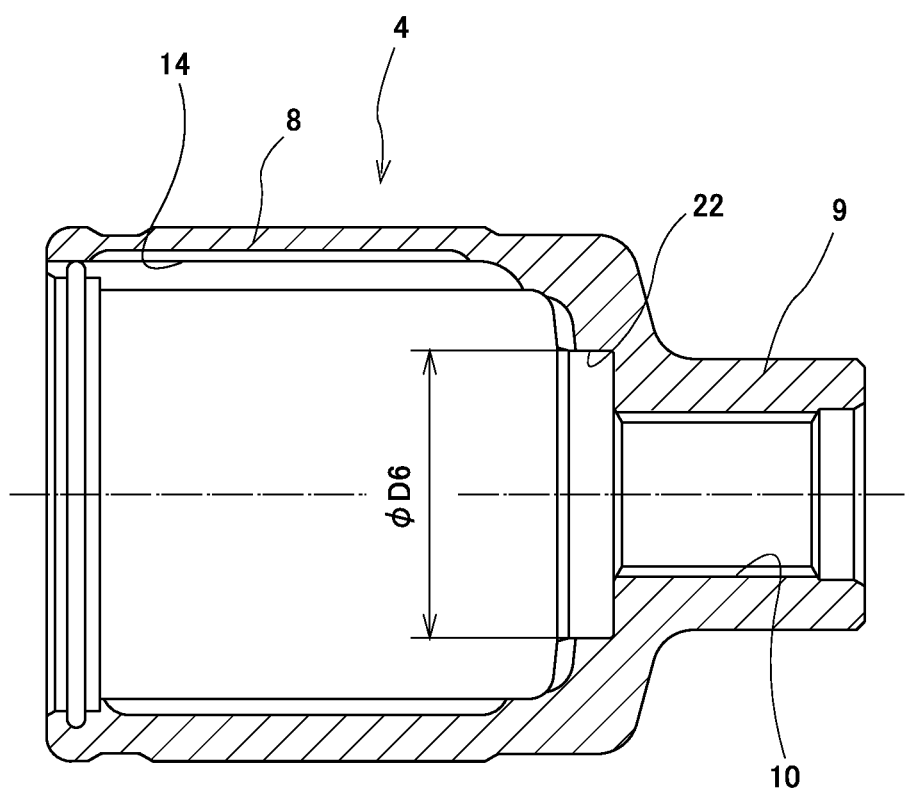
FIG. 10 is an enlarged sectional view of an outer ring of the sliding constant velocity universal joint in FIG. 1.
Figure 11:
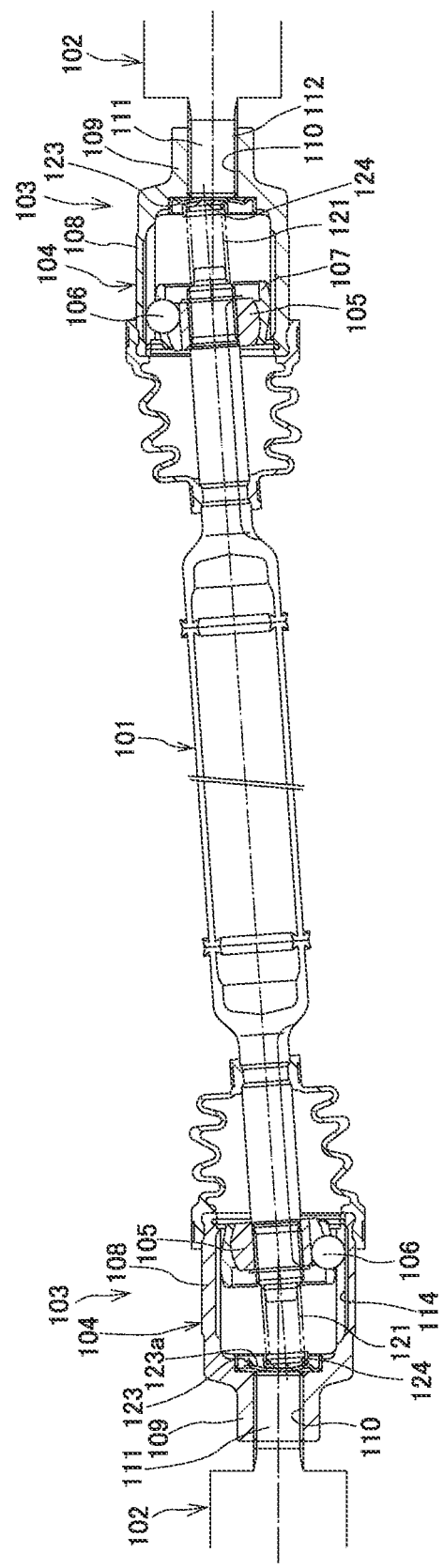
FIG. 11 is a sectional view which shows a propeller shaft having its two ends provided with conventional sliding constant velocity universal joints.
Figure 12:
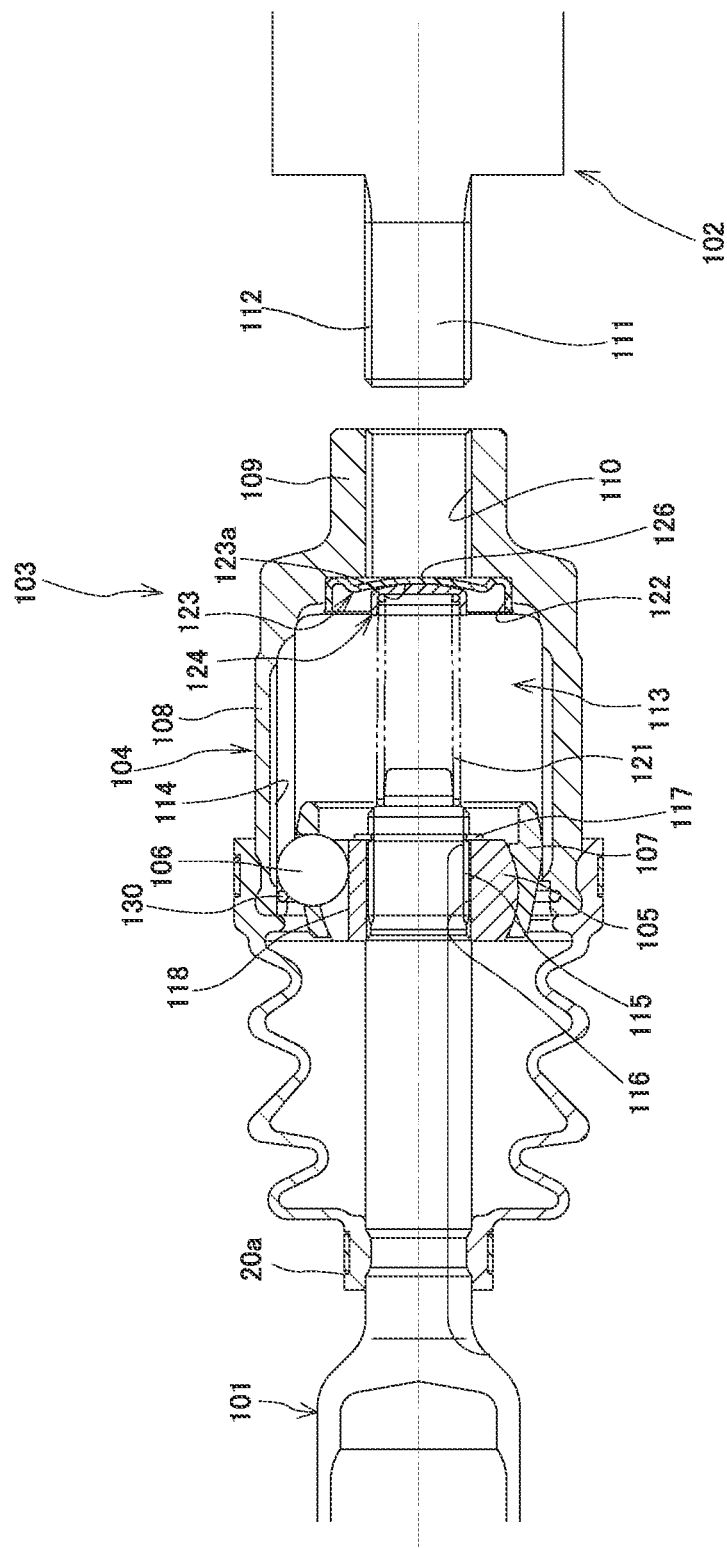
FIG. 12 is a sectional view showing a state in which a power transmission member is not attached to the sliding constant velocity universal joint in FIG. 11.
Figure 13:
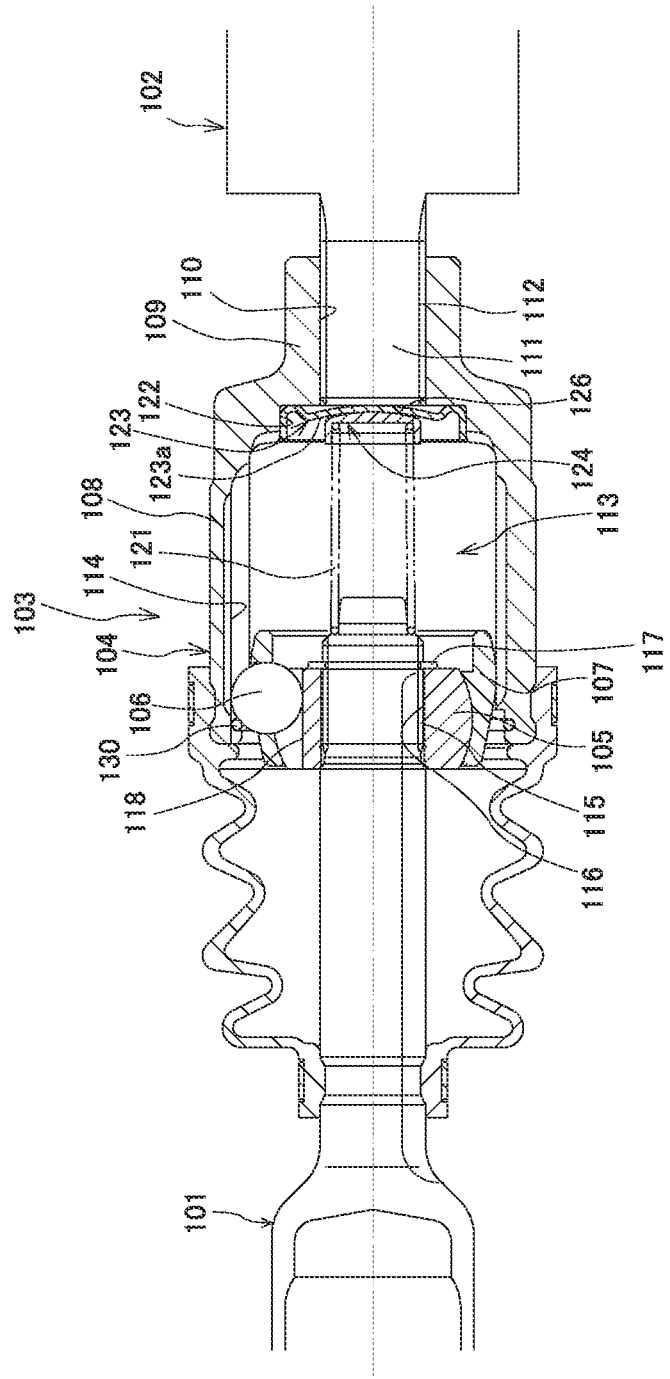
FIG. 13 is a sectional view showing a state in which a power transmission member is attached to the sliding constant velocity universal joint in FIG. 11.
Figure 14:
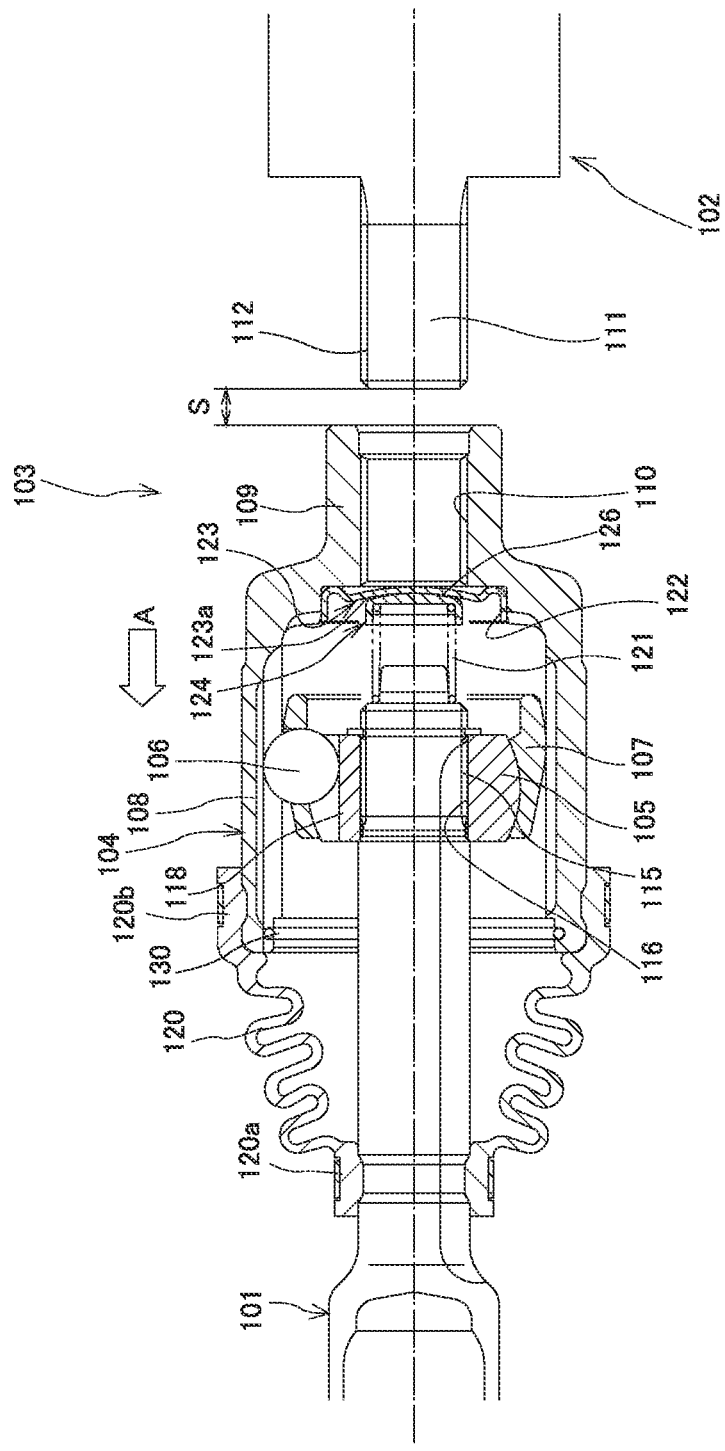
FIG. 14 is a sectional view which shows a state where a power transmission member is being attached by compressing a coil spring of the sliding constant velocity universal joint in FIG. 11.
Figure 15:
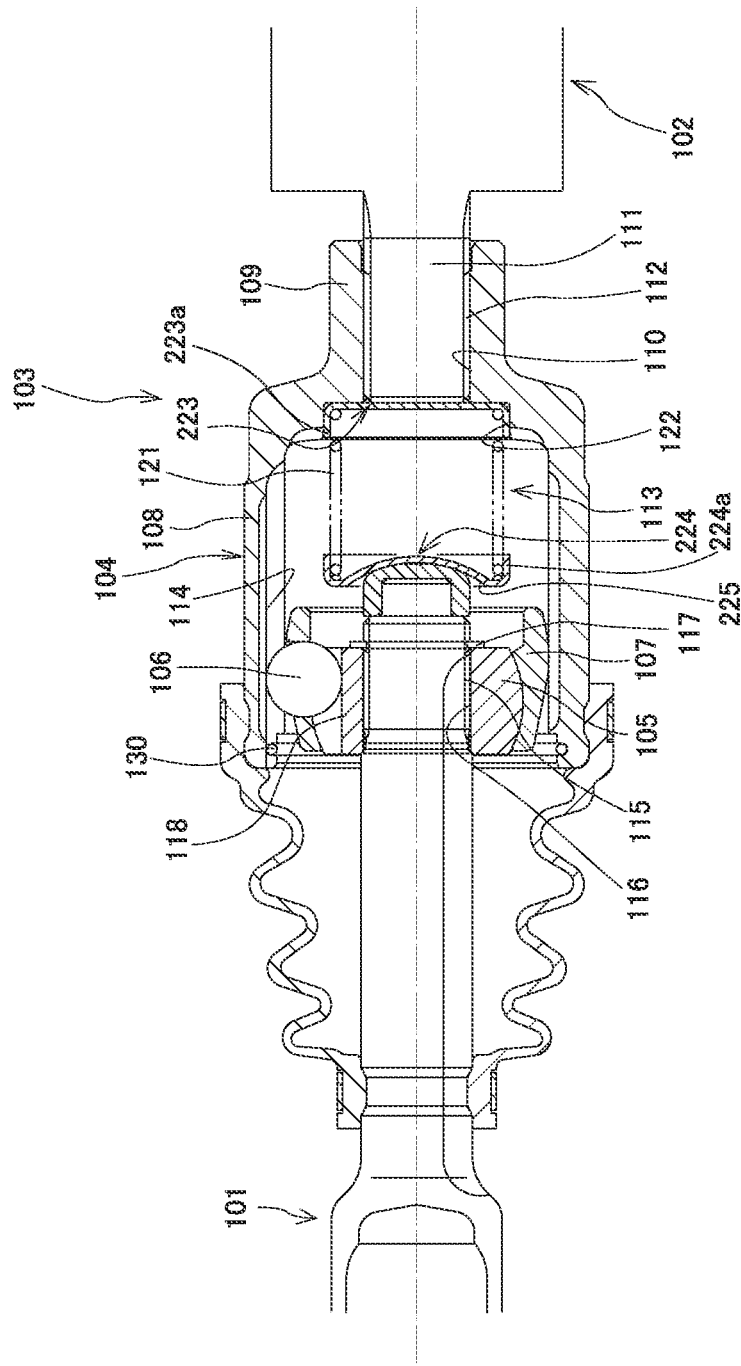
FIG. 15 is a sectional view showing a state in which a power transmission member is attached to another conventional sliding constant velocity universal joint.
Figure 16:
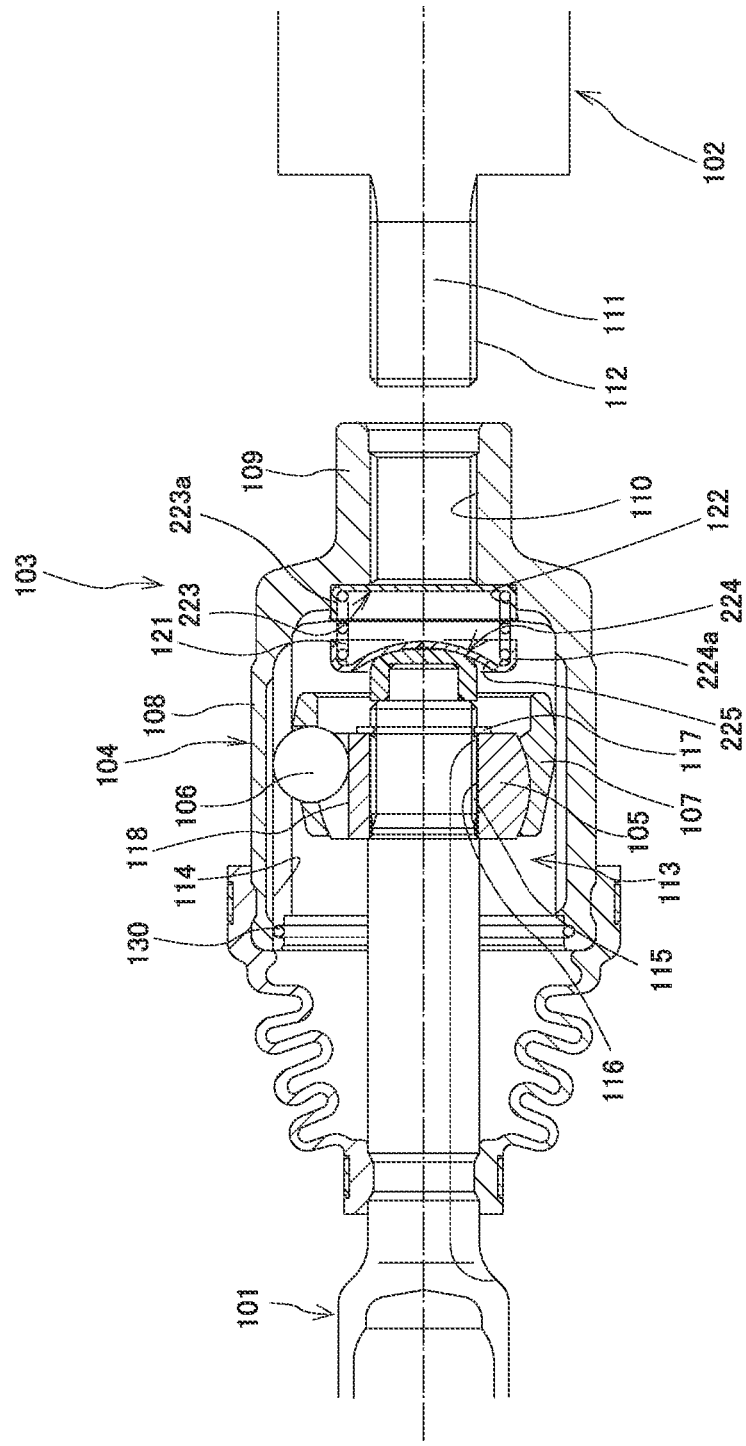
FIG. 16 is a sectional view which shows a state where a power transmission member is being attached by compressing a coil spring of the sliding constant velocity universal joint in FIG. 15.

As shown in FIG. 9, the end plate 23 has a concave spherical surface portion 23a which faces an end of the coil spring 21, and a short, cylindrical edge portion 23b which fits into the recess 22 (see FIG. 3). The short cylindrical edge portion 23b has its outer diameter φD5 made larger than an inner diameter φD6 of the recess 22, so that the end plate 23 is press-fitted into the recess 22 of the outer ring 4 (FIG. 9 and FIG. 10).

At an end of the coil spring 21 which faces the end plate 23, a receptacle 24 is fitted to an inner diameter portion of the coil spring 21 (see FIG. 1).

Figure 8:
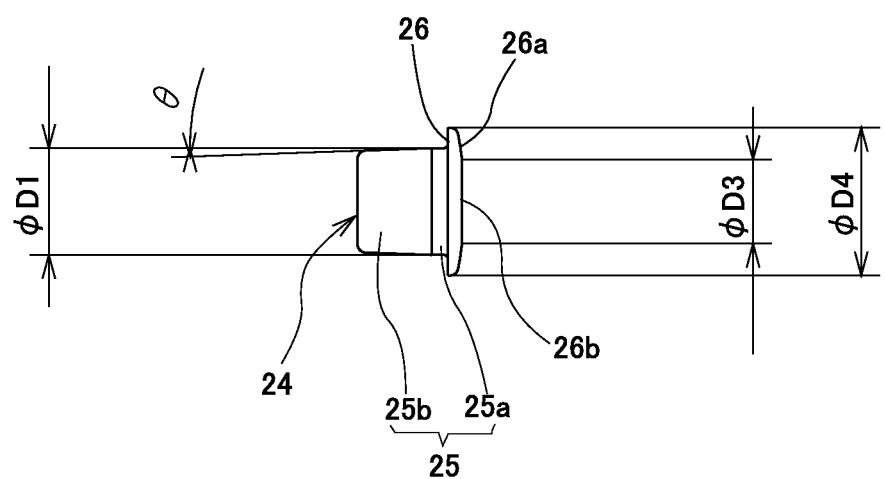
FIG. 8 is an enlarged view of a receptacle of the sliding constant velocity universal joint in FIG. 1.

Referring to FIG. 8 and FIG. 9, the receptacle 24 includes a protruding portion 25 for fitting into the inner diameter portion of the coil spring 21, and a flange portion 26 for making contact with an end surface of the coil spring 21. The flange portion 26 has its outer surface formed with a convex spherical surface portion 26a which is guided by contact onto the concave spherical surface portion 23a of the end plate 23 (FIG. 8).

The concave spherical surface portion 23a of the end plate 23 has a greater curvature radius than that of the convex spherical surface portion 26a in the receptacle 24, whereby it is possible to decrease sliding friction between the two portions.

Also, the convex spherical surface portion 26a of the receptacle 24 may have its center region formed with a flat end-surface portion 26b, whereby it becomes possible to further decrease sliding friction between the receptacle 24 and the end plate 23.

Figure 6:
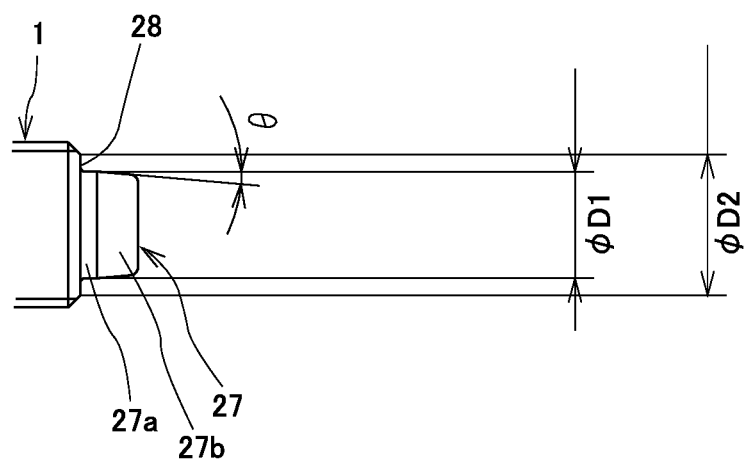
FIG. 6 is an enlarged view of an end portion of a shaft of the sliding constant velocity universal joint in FIG. 1.

At a tip of the shaft 1, there is provided a shaft protruding portion 27 which provides support when inserted into an inner diameter portion at the other end of the coil spring 21 (FIG. 6).

Figure 4:
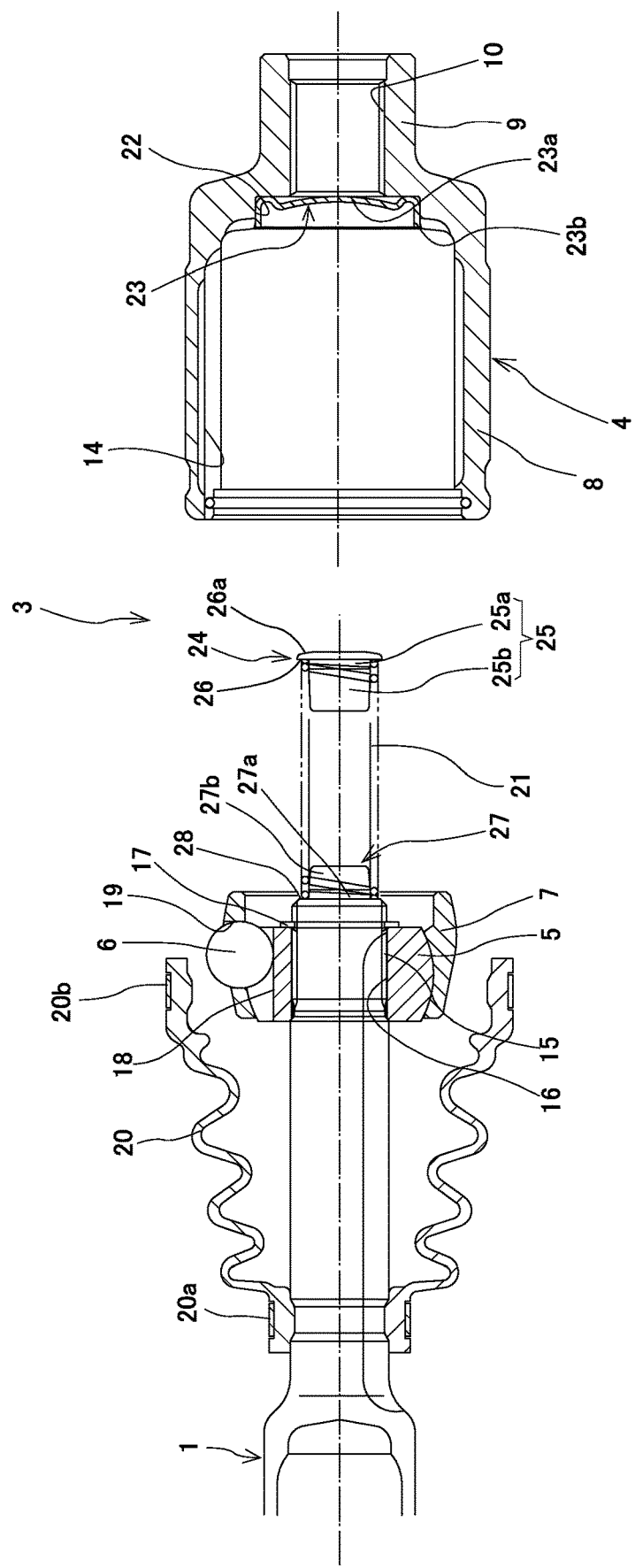
FIG. 4 is a sectional view of the sliding constant velocity universal joint in FIG. 1 in a state during assembly.

The coil spring 21 has one end having an inner diameter portion fitted with the shaft protruding portion 27 of the shaft 1, and another end having an inner diameter portion fitted with the protruding portion 25 of the receptacle 24 (see FIG. 4).

Figure 7:
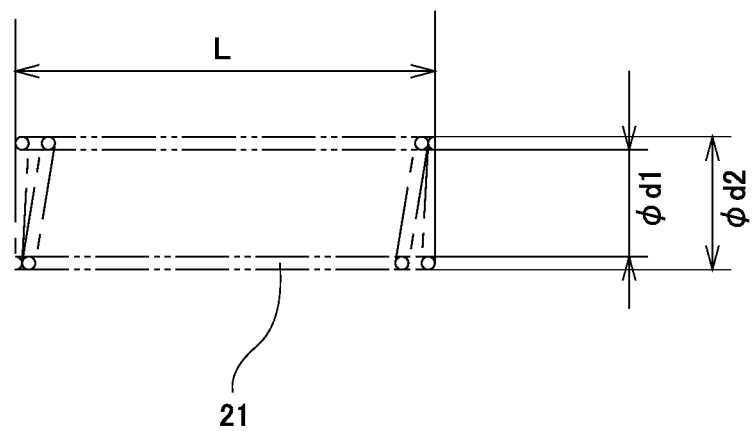
FIG. 7 is an enlarged view of the coil spring of the sliding constant velocity universal joint in FIG. 1.

As shown in FIG. 8, the protruding portion 25 of the receptacle 24 includes a flat cylindrical portion 25a of a diameter φD1 which interferes with an inner diameter φd1 (see FIG. 7) of the coil spring 21, and a tapered portion 25b which has an angle θ from the flat cylindrical portion 25a toward the tip.

As shown in FIG. 6, the shaft protruding portion 27 has an outer diameter surface including a flat cylindrical portion 27a of a diameter φD1 which interferes with an inner diameter φ1 (see FIG. 7) of the coil spring 21, and a tapered portion 27b which has an angle θ from the flat cylindrical portion 27a toward the tip. Also, in an end surface of the shaft 1, there is provided a receptacle surface portion 28 of an outer diameter φD2 which has a size for accepting an end surface of the coil spring 21 of an outer diameter φd2.

The diameter φD1 of the flat cylindrical portion 27a in the shaft protruding portion 27 and the diameter φD1 of the flat cylindrical portion 25a in the protruding portion 25 of the receptacle 24 have an interference with respect to the inner diameter φd1 of the coil spring 21; i.e., φd1<φD1. By assembling the coil spring 21 with the shaft protruding portion 27, and with the protruding portion 25 of the receptacle 24, it is possible to place the coil spring 21 stably at correct positions in the flat cylindrical portion 27a of the shaft protruding portion 27 and in the flat cylindrical portion 25a of the protruding portion 25 of the receptacle 24, and the state of assembly is externally visible.

Also, the outer diameter φD4 of the flange portion 26 in the receptacle 24 is formed in a size to accept the end surface of the coil spring 21 which has an outer diameter φd2.

By providing the tapered portion 25b and the tapered portion 27b in the outer diameter surface of the shaft protruding portion 27 and in the outer diameter surface of the protruding portion 25 in the receptacle 24, it is possible to improve assemblability into the inner diameter portions of the coil spring 21.

By supporting the two ends of the coil spring 21 with the outer diameter surface of the shaft protruding portion 27 and the outer diameter surface of the protruding portion 25 of the receptacle 24, it becomes possible to stably place the coil spring 21 at a predetermined position, and the state of assembly is externally visible. Therefore, the coil spring 21 no longer comes off the shaft protruding portion 27 or the receptacle 24, and it is possible to elastically urge the sliding constant velocity universal joint 3 in a sliding fashion.

The receptacle 24 and the end plate 23 are made of metal or resin. Both of the receptacle 24 and the end plate 23 may be made of metal or made of resin, or only one of them may be made of metal with the other made of resin.

As an applicable resin material for a light sliding portion, POM (polyacetal) or PA (nylon) is preferable for its ware resistance, slidability and dimensional stability.

Also, the outer ring 4 may be made of a carbon steel for machine structural use (such as S53C) or a chromium-molybdenum steel (such as SCM420). These materials should be heat treated by means of induction hardening tempering or carburizing and quenching.

In the state shown in FIG. 1 and FIG. 2, the elastic urge from the coil spring 21 makes a press fit between the convex spherical surface portion 26a of the receptacle 24 and the concave spherical surface portion 23a of the end plate 23. Also, since the convex spherical surface portion 26a has a smaller curvature radius than that of the concave spherical surface portion 23a, the convex spherical surface portion 26a and the concave spherical surface portion 23a make an annular line-contact.

It should be noted here that the coil spring 21 is in a compressed state inside the outer ring 4. In other words, the coil spring 21 is capable of providing its elastic urge in both axial directions within a range of axial movement of the ball 6, i.e., over the entire sliding stroke of the constant velocity universal joint 3.

When the two power transmission members make an angle (operating angle), in other words, when there is a state change from operating angle 0° to the operating angle θ in FIG. 1, the convex spherical surface portion 26a of the receptacle 24 attached to the tip of the coil spring 21 slides on the concave spherical surface portion 23a of the end plate 23 in the outer ring 4. The convex spherical surface portion 26a of the receptacle 24 makes an annular line-contact onto the concave spherical surface portion 23a, resulting in a smooth stable sliding movement. On the other hand, the coil spring 21 is disposed in parallel with the axial direction, being held at a stable attitude.

As described, even if the shaft 1 pivots around the power transmission member 2, the coil spring 21 is always held at a stable attitude, and therefore it is possible to provide stable torque transmission.

Next, description will be made for a method of installing the sliding constant velocity universal joints 3 which are assembled to the two ends of the shaft 1, to two power transmission members which are spaced from each other by a predetermined distance.

First, as shown in FIG. 3, the inner ring 5, the balls 6 and the retainer 7 are assembled together, and then fixed to the tip of the shaft 1 with the snap ring 17 so that the inner ring 5 will not come out. The end plate 23 is fitted into the recess 22 of the outer ring 4.

Then, as shown in FIG. 4, the inner diameter portion at an end of the coil spring 21 is inserted and fixed into the shaft protruding portion 27 of the shaft 1, whereas the protruding portion 25 of the receptacle 24 is inserted and fixed into the inner diameter portion at the other end of the coil spring 21. The inner ring 5 is attached inside the outer ring 4, thereby assembling the sliding constant velocity universal joint 3.

Figure 5:
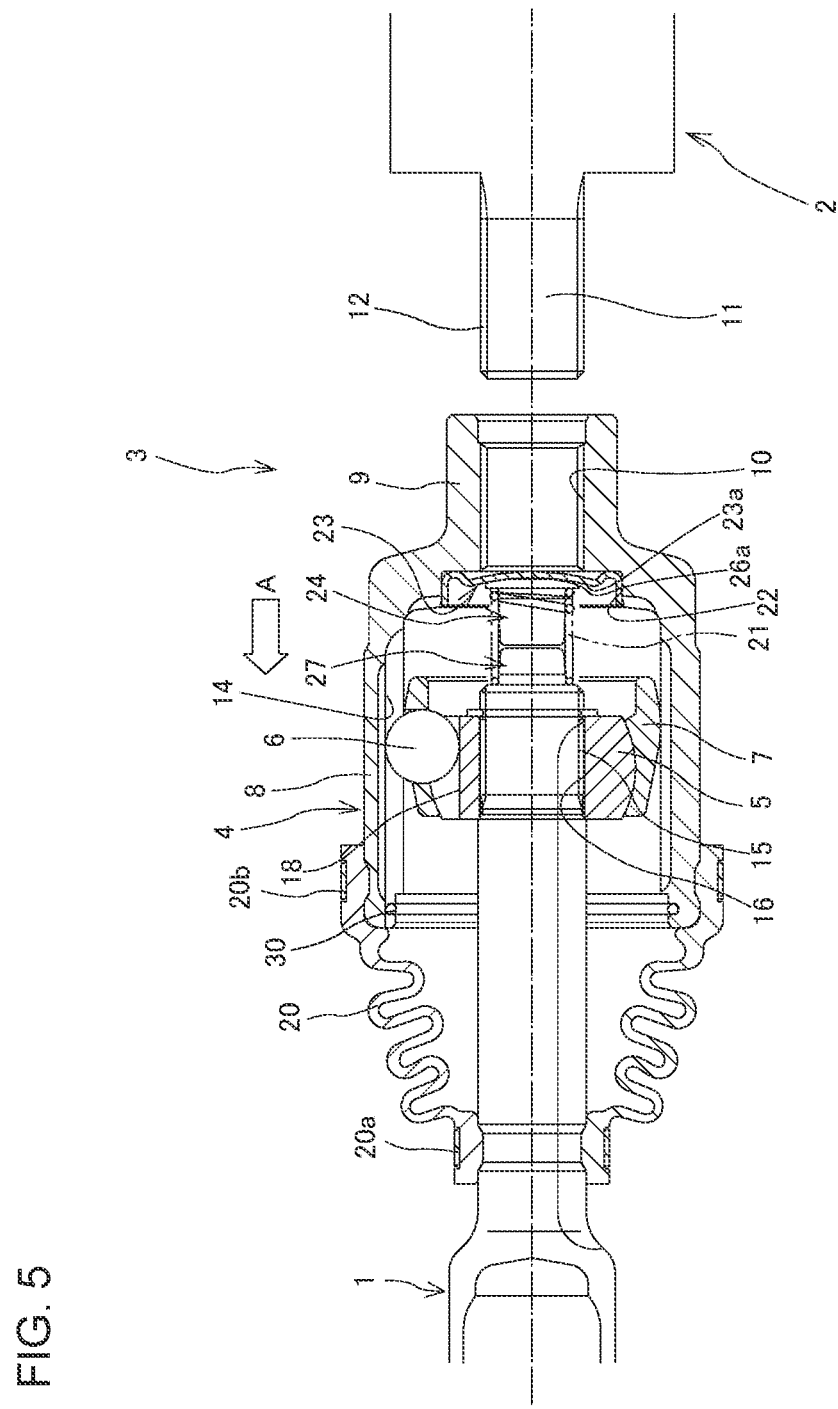
FIG. 5 is a sectional view which shows a state where a power transmission member is being attached by compressing a coil spring of the sliding constant velocity universal joint in FIG. 1.

Thereafter, the small-diameter tube portion 9 of one of the sliding constant velocity universal joint 3 is axially slid around the spline shaft 11 of the corresponding power transmission member 2 to be fitted therearound (see FIG. 2). In this state, an axial length from the tip of one sliding constant velocity universal joint 3 to the tip of the other sliding constant velocity universal joint 3 is longer than the distance between the power transmission members 2, 2. Therefore, as shown in FIG. 5, an axial pressing force A is applied to the other sliding constant velocity universal joint 3, to compress the coil springs 21 in both sliding constant velocity universal joints 3. In other words, by applying the pressing force A thereby compressing the coil springs 21, it is possible to shorten the axial tip-to-tip length of the two sliding constant velocity universal joints 3, 3 than the distance between the power transmission members 2, 2. Thereafter, the small-diameter tube portion 9 of the other sliding constant velocity universal joint 3 is axially slid around the spline shaft 11 of the corresponding power transmission member 2 to be fitted therearound, and this completes the installation.

Once the installation is completed, as shown in FIG. 1 and FIG. 2, the elastic urge from the coil spring 21 presses the outer ring 4 of the sliding constant velocity universal joint 3 onto the corresponding power transmission member 2, thereby maintaining the fitting between the sliding constant velocity universal joint 3 and the power transmission member 2. Also, the shaft 1 is held at a position where the elastic forces from the coil springs 21, 21 located at the two ends are balanced.

It should be noted here that the method of installation is not limited to the above-described example. Another example may be that both sliding constant velocity universal joints 3,3 are pressed toward the shaft 1 to shorten the axial length, and thereafter each of the sliding constant velocity universal joints 3, 3 is fitted around the power transmission members 2, 2 one after the other or simultaneously.

When removing the installed sliding constant velocity universal joint 3 from the power transmission member 2, the above-described method should simply be performed in the reverse order, so no more description will be made here.

Thus far, an embodiment of the present invention has been described, but the present invention is not limited to the described embodiment. It is obvious that the invention may be varied in many ways within the scope of the present invention. For example, a sliding constant velocity universal joint according to the present invention may be connected only to one end of a shaft rather than to both ends.

REFERENCE SIGNS LIST

1: shaft
2: power transmission member
3: sliding constant velocity universal joint
4: outer ring
5: inner ring
6: ball
7: retainer
8: large-diameter tube portion
9: small-diameter tube portion
10: female spline groove
11: spline shaft
12: male spline groove
13: housing space
14: ball groove
15: male spline groove
16: female spline groove
17: snap ring
18: ball groove
19: pocket
20: boot
20a, 20b: boot band
21: coil spring
22: recess
23: end plate
23a: concave spherical surface portion
23b: edge portion
24: receptacle
25: convex portion
25a: flat cylindrical portion
25b: tapered portion
26: flange portion
26a: convex spherical surface portion
26b: flat end-surface portion
27: shaft protruding portion
27a: flat cylindrical portion
27b: tapered portion
28: receptacle surface portion
30: snap ring

The invention claimed is:

1. A sliding constant velocity universal joint comprising an outer joint member connected to a power transmission member and an inner joint member connected to an end portion of a shaft, for torque transmission between the outer joint member and the inner joint member while allowing an angle change and an axial change therebetween, wherein the outer joint member incorporates therein an elastic member axially expandable/retractable between a tip of the shaft connected to the inner joint member and the outer joint member;

the tip of the shaft is provided with a shaft protruding portion for supporting an inner diameter portion of a shaft-side end of the elastic member;

the elastic member has its outer-joint-member side end provided with a receptacle for fitting into the inner diameter portion of the elastic member;

the outer joint member has its inner surface press-fitted by an end plate;

the receptacle is pressed onto the end plate in the inner surface of the outer joint member;

the shaft protruding portion for supporting the inner diameter portion of the elastic member, and the receptacle for fitting into the inner diameter portion of the elastic member have their outer diameter surfaces provided by a combination of a cylindrical portion and a tapered portion.

2. The sliding constant velocity universal joint according to claim 1, wherein
the receptacle and the end plate are made of metal or resin.

3. The sliding constant velocity universal joint according to claim 1, wherein
the receptacle's surface facing the end plate is formed with a convex spherical surface portion;
the end plate is provided with a concave spherical surface portion for contact guide of the convex spherical surface portion of the receptacle; and
the convex spherical surface portion has a smaller curvature radius than that of the concave spherical surface portion.

4. The sliding constant velocity universal joint according to claim 3, wherein
the convex spherical surface portion of the receptacle has its center region formed with a flat end-surface portion.

5. A sliding constant velocity universal joint comprising an outer joint member connected to a power transmission member and an inner joint member connected to an end portion of a shaft, for torque transmission between the outer joint member and the inner joint member while allowing an angle change and an axial change therebetween, wherein the outer joint member incorporates therein an elastic member axially expandable/retractable between a tip of the shaft connected to the inner joint member and the outer joint member;

the tip of the shaft is provided with a shaft protruding portion for supporting an inner diameter portion of a shaft-side end of the elastic member;

the elastic member has its outer-joint-member side end provided with a receptacle for fitting into the inner diameter portion of the elastic member;

the outer joint member has its inner surface press-fitted by an end plate;

the receptacle is pressed onto the end plate in the inner surface of the outer joint member;

the receptacle's surface facing the end plate is formed with a convex spherical surface portion;

the end plate is provided with a concave spherical surface portion for contact guide of the convex spherical surface portion of the receptacle; and the convex spherical surface portion has a smaller curvature radius than that of the concave spherical surface portion.

6. The sliding constant velocity universal joint according to claim 5, wherein
the receptacle and the end plate are made of metal or resin.

7. The sliding constant velocity universal joint according to claim 5, wherein
the shaft protruding portion for supporting the inner diameter portion of the elastic member, and the receptacle for fitting into the inner diameter portion of the elastic member have their outer diameter surfaces provided by a combination of a cylindrical portion and a tapered portion.

8. The sliding constant velocity universal joint according to claim 5, wherein
the convex spherical surface portion of the receptacle has its center region formed with a flat end-surface portion.

* * * * *